No. 751,027. PATENTED FEB. 2, 1904.
W. W. SWEETLAND.
CLUTCH MECHANISM.
APPLICATION FILED SEPT. 25, 1903.
NO MODEL. 2 SHEETS—SHEET 1.
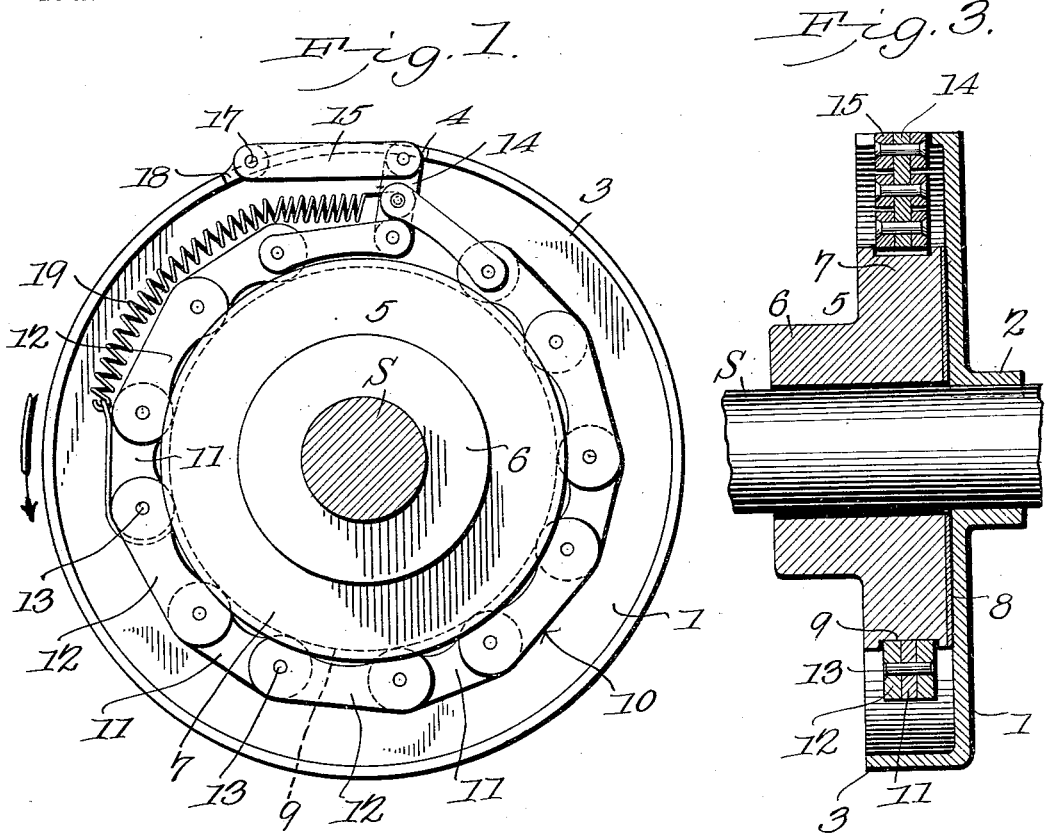
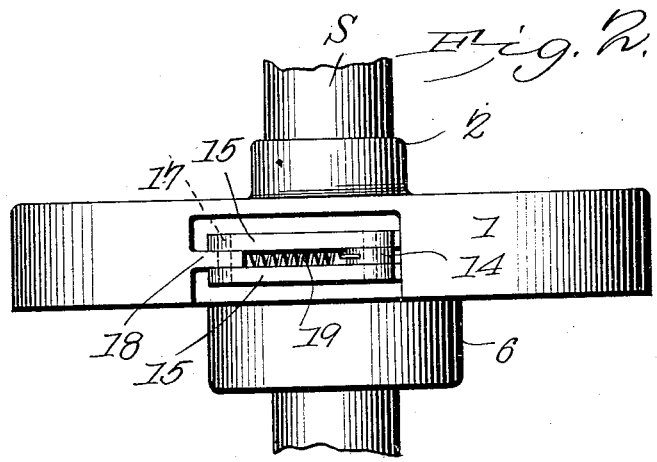
Witnesses
E. F. Stewart
Baxter Morton
W. W. Sweetland, Inventor,
by C. A. Snow & Co.
Attorneys

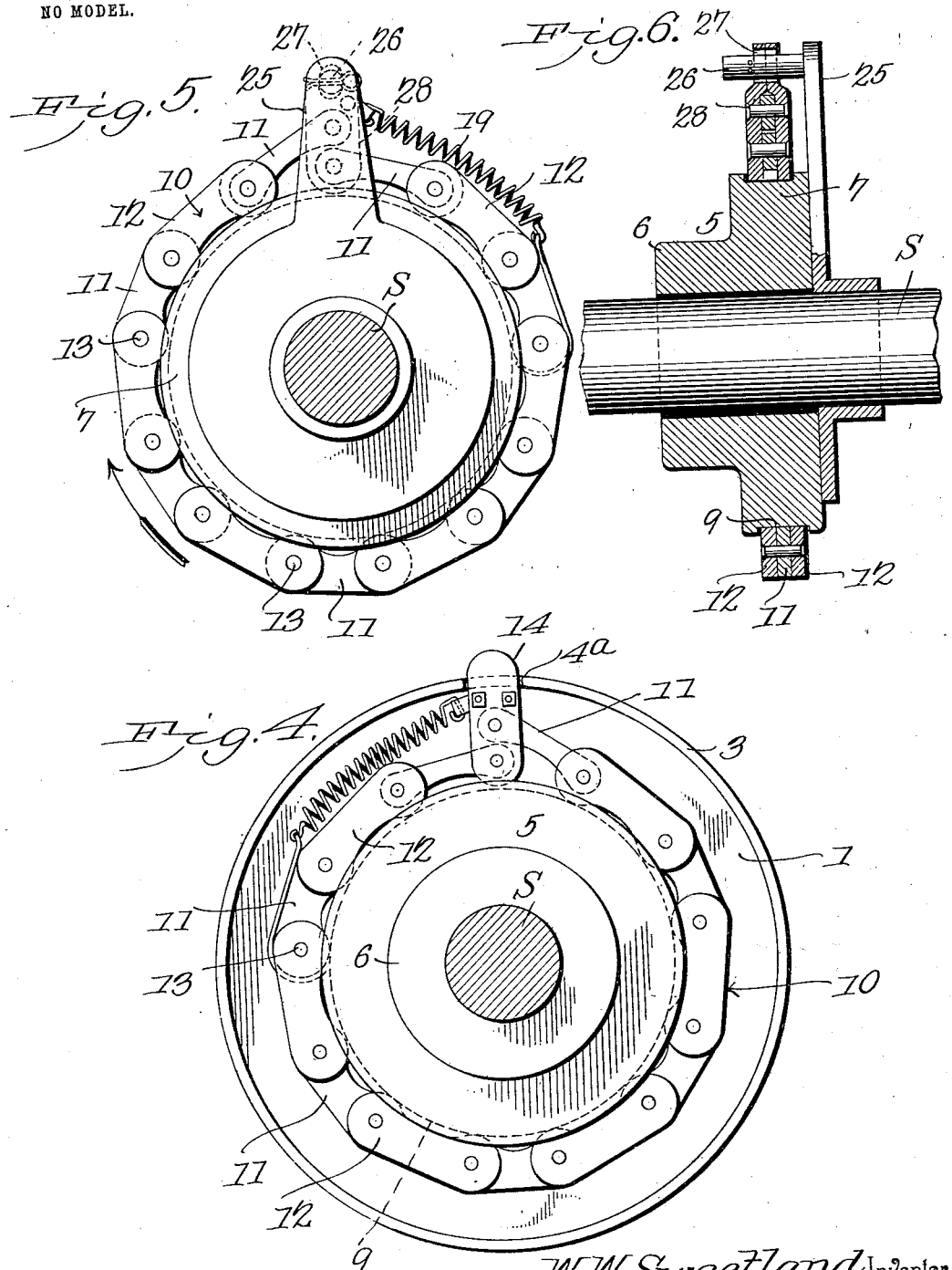

No. 751,027. Patented February 2, 1904.

UNITED STATES PATENT OFFICE.

WILLIAM W. SWEETLAND, OF EDWARDSBURG, MICHIGAN, ASSIGNOR OF TWO-THIRDS TO FRANK SWEETLAND AND JAMES SWEETLAND, OF ANGOLA, NEW YORK.

CLUTCH MECHANISM.

SPECIFICATION forming part of Letters Patent No. 751,027, dated February 2, 1904.

Application filed September 25, 1903. Serial No. 174,622. (No model.)

*To all whom it may concern:*

Be it known that I, WILLIAM W. SWEETLAND, a citizen of the United States, residing at Edwardsburg, in the county of Cass and State of Michigan, have invented a new and useful Clutch Mechanism, of which the following is a specification.

This invention relates to friction-clutches of the type commonly known as "strap-clutches," in which a band faced with suitable gripping material surrounds a suitable clutch member and is brought into contact with substantially the entire periphery of the clutch member by tightening the band.

The object of the present invention is to provide in a clutch of the type specified a substitute for the ordinary band or strap which will act instantaneously both in gripping and releasing the clutch member and which will continue to operate satisfactorily after the parts have become very much worn.

A further object of the invention is to provide improved mechanism for drawing the clutch into and out of operation in order that the action of the clutch may be practically instantaneous.

Another object of the invention is to provide a clutch of the type specified which shall be characterized by great simplicity of construction and great durability in service.

In attaining the objects above stated I make use of the novel construction and combination of parts of a clutch mechanism hereinafter described, illustrated in the accompanying drawings, and specifically pointed out in the claims.

In the drawings, Figure 1 is a face view looking from the left of Fig. 3. Fig. 2 is a plan view. Fig. 3 is a section in the diametral plane through the operating-lever. Fig. 4 is a face view of a modified form of the invention. Fig. 5 is a face view from the opposite side of another modified form of the invention. Fig. 6 is a sectional view in the diametral plane through the operating-lever of the form of the invention shown in Fig. 5.

Referring to the drawings, in which corresponding parts are designated by similar characters of reference throughout the several views, S designates a shaft upon which is mounted a member 1, which for convenience will be referred to as the driving member. The driving member comprises a pulley 2 or a common spur-gear, and in the preferred form has a flange 3 extending almost entirely around its periphery and forming a shield over the clutch mechanism. The flange 3 is cut away at 4 for purposes to be presently explained.

Adjacent to the driving member 1 there is loosely mounted on the shaft a clutch member 5, which is also preferably provided with a pulley 6 to support a belt. The portion of the clutch member which lies adjacent to the driving member is a shrouded disk 7, rigidly connected to or formed integral with the rest of the clutch member. To prevent contact between the disk 7 and the driving member, a thin washer or separating-plate 8 is arranged on the shaft between them. The shrouded disk 7 presents on its periphery a shallow groove 9, in which is arranged a chain 10, consisting of blocks 11 and side plates 12, connected by rivets 13 in the same manner that sprocket-chains for power transmission are ordinarily constructed. The blocks and side plates of the chain are hollowed on their faces for contact with the bottom of the groove in the periphery of the disk and are adapted to grip the disk very positively. The circumference of the disk 7 and the length of the chain 10 are so proportioned that at each end of the chain there is a pair of side plates and the two ends of the chain overlap slightly, as shown in Fig. 1. Both ends of the chain are pivotally connected with a short lever 14, arranged between the terminal side plates and disposed substantially perpendicular to the periphery of the disk 7. At the outer end of the lever 14 it is preferably pivotally connected with a pair of plates 15, supported on a pivot-pin 17, arranged in an eye 18 at one end of the gap 4 in the flange of the driving member. To hold the lever normally perpendicular to the periphery of the disk 7, a spring 19, preferably of coil form, is attached at one end to the lever intermediate of its ends and at the other end is connected with the chain in any suitable manner, as by means of a double hook 20, bent to conform to the curve at the end of one of the blocks 11.

The operation of the clutch, as above described, will be readily understood. When the driving member is rotated in the direction indicated by the arrow in Fig. 1 and a pull is exerted upon the plates 15, the chain 10 will be tightened around the periphery of the disk 7 and the clutch member will be so firmly gripped that the driving member and the clutch member will rotate as a single structure. When the driving member is turned in the direction opposite to that indicated by the arrow, a push will be exerted upon the side plates 15 and the lever 14 will be swung in the direction to loosen the chain, so that it will no longer grip the periphery of the disk 7. The action of the lever in tightening or loosening the chain is practically instantaneous and the wear upon either the chain or disk is consequently very slight. Moreover, the gripping engagement of the chain with the rim of the disk is brought about simultaneously in all the parts of the chain, so that the wear upon the various parts is distributed with great uniformity.

In Fig. 4 a modified form of the invention is illustrated, in which the side plates connecting the operating-lever and the driving member are omitted. In this form of the invention the driving member is provided with a smaller gap 4$^a$ in the flange, and the lever 14, which fits easily in the gap, is operated by the direct pressure of the edges of the gap against the lever when the driving member is rotated in either direction. This modified form of the invention is in other respects similar to the preferred form and is simpler and less expensive; but owing to the wear of the edges of the gap 4$^a$ in the flange on the driving member this form of the invention will not operate as satisfactorily after it has been in use for some time as the preferred form.

A second modification of the invention is illustrated in Fig. 6, in which the driving member is shown as having no flange over the clutch mechanism and as having an extending arm 25, at the end of which is rigidly mounted a stud 26, which engages an elongated opening 27 in the operating-lever 28. The lever 28 is bifurcated at its lower end and is pivotally connected with terminal blocks of the chain instead of terminal plates, as in the forms of the invention already described.

The operation of the form of the invention last described is substantially the same as that of the other two forms, the operating-lever being swung into position to tighten the chain or release it by the rotation of the driving member in the direction indicated or the reverse, and the elongated slot in the lever which is engaged by the stud 26 affords sufficient play for the stud to compensate for the swinging of the lever.

In all of the several forms of the embodiment of the invention above described the action is exceedingly positive and the response of the clutch mechanism to a change in the direction of rotation of the driving member is immediate. The parts of the structure are so designed that wear is reduced to a minimum; but even when much worn the operation of the clutch is not impaired.

While I have described and illustrated the preferred forms of the invention, it is to be understood that various minor changes in the details of construction may be resorted to without departing from the invention or sacrificing its advantages, and the right to make such changes is reserved.

Having thus described the construction and operation of my invention, what I claim as new, and desire to secure by Letters Patent, is—

1. In a clutch mechanism, the combination with a shaft, of a circular clutch member, a driving member, said clutch member and said driving member being supported on said shaft for independent rotation, a chain disposed around the clutch member, a lever pivotally connected with both ends of said chain and connected at its outer end to said driving member.

2. In a clutch mechanism, the combination with a shaft, of a clutch member mounted on said shaft, a driving member also mounted on said shaft and rotatable independently of the said shaft, a chain encircling said clutch member, a lever pivotally connected to both ends of said chain, and link connections between the outer end of said lever and the driving member.

3. In a clutch mechanism, the combination with a shaft, of a clutch member mounted on the shaft, a driving member also mounted on the shaft adjacent to the clutch member and independently rotatable, a chain encircling the clutch member, a lever pivotally connected with both ends of the chain, a spring connected at one end with said chain and at the other end with said lever and keeping said chain normally tight, and connections between the outer end of said lever and the driving member.

4. In a clutch mechanism, the combination of a shaft, a clutch member mounted on the shaft, a driving member also mounted on the shaft adjacent to the clutch member, a chain encircling the clutch member, a lever pivotally connected with both ends of the chain, operative connections between the lever and the driving member, a spring connected at one end to the lever and a hook at the other end of the spring adapted to fit over a block in the chain.

5. In a clutch mechanism, the combination of a shaft, a clutch member mounted on the shaft, a driving member also mounted on the shaft and independently rotatable, said clutch member having a flange with a gap therein extending over the clutch member, a chain encircling the clutch member, a lever pivotally connected to both ends of said chain and projecting into the gap in the flange on the driving member, a spring operative upon said lever to keep the chain normally tight, and link connections between the outer end of said lever and the driving member.

In testimony that I claim the foregoing as my own I have hereto affixed my signature in the presence of two witnesses.

WILLIAM W. SWEETLAND.

Witnesses:
E. B. CRISWELL,
J. D. BEAN.